US008229110B1

(12) United States Patent
Loc et al.

(10) Patent No.: US 8,229,110 B1
(45) Date of Patent: *Jul. 24, 2012

(54) PIPELINED PACKET ENCRYPTION AND DECRYPTION USING COUNTER MODE WITH CIPHER-BLOCK CHAINING MESSAGE AUTHENTICATION CODE PROTOCOL

(75) Inventors: Peter Loc, Cupertino, CA (US); Rahul Kopikare, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 583 days.

This patent is subject to a terminal disclaimer.

(21) Appl. No.: 12/217,928

(22) Filed: Jul. 10, 2008

Related U.S. Application Data

(62) Division of application No. 10/974,458, filed on Oct. 27, 2004, now Pat. No. 7,742,594.

(51) Int. Cl.
*H04K 1/00* (2006.01)
*H04L 9/00* (2006.01)
*H04L 9/28* (2006.01)

(52) U.S. Cl. ....................................... 380/28
(58) Field of Classification Search ........... 380/28
See application file for complete search history.

(56) References Cited

U.S. PATENT DOCUMENTS

| | | | |
|---|---|---|---|
| 6,965,674 | B2 | 11/2005 | Whelan et al. |
| 7,245,724 | B1 | 7/2007 | Chesson et al. |
| 7,350,077 | B2 | 3/2008 | Meier et al. |
| 2004/0083362 | A1 | 4/2004 | Park et al. |
| 2004/0142710 | A1 | 7/2004 | Liang |
| 2004/0202317 | A1 | 10/2004 | Demjanenko et al. |
| 2005/0172119 | A1 | 8/2005 | Eckhardt et al. |
| 2005/0278548 | A1 | 12/2005 | Lin et al. |

OTHER PUBLICATIONS

IEEE P802.11i, IEEE Standard for Information technology—Telecommunications and information exchange between systems—Local and metropolitan area networks—Specific requirements; Part 11: Wireless Medium Access Control (MAC) and Physical Layer (PHY) specifications: Amendment 6: Medium Access Control (MAC) Security Enhancements, Apr. 2004, pp. 1-171.

IEEE Standard 802.11 (1999 Edition; 542 pages); IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications.

IEEE Standard 802.11a (1999 Edition; Amdended 2000; 92 pages); Supplement to IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; High-Speed Physical Layer in the 5 GHz Band.

(Continued)

*Primary Examiner* — Jason Gee

(57) ABSTRACT

An apparatus includes a key mixing circuit to generate N groups of decryption seeds, each generated based upon a predetermined key, a transmitter address, and a predetermined start value for a packet number. An input circuit receives N encrypted packets, each including the transmitter address and one of N values for the packet number. A decryption circuit decrypts each of the N encrypted packets using one of the N groups of decryption seeds that was generated based on the one of the N values in a respective one of the N encrypted packets. The key mixing circuit generates each of the N groups of decryption seeds before the input circuit receives the respective one of the N encrypted packets of the data. The predetermined start value is initialized when the apparatus is initialized and incremented when each of the N groups of decryption seeds is generated.

17 Claims, 5 Drawing Sheets

OTHER PUBLICATIONS

IEEE Standard P802.11G, Draft Supplement to Standard for Information technology—Telecommuncations and information exchange beween systems—Local and metropolitan area networks—Specific requirements, Part 11: Wireless LAN Medium Access Control (MAC) and Physical Layer (PHY) specifications: Further Higher Data Rate Extension in the 2.4 GHz Band, Apr. 2003, pp. 1-69.

U.S. Appl. No. 10/974,388, filed Oct. 27, 2004, Loc et al.

IEEE Standard 802.11b (Sep. 16, 1999 Edition) 96 pages); Supplement to IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Higher-Speed Physical Layer Extension ni the 2.4 GHz Band.

IEEE Standard 802.11i (Apr. 2004) 177 pages); IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 6: Medium Access Control (MAC) Security Enhancements.

IEEE 802.20-PD-06 (Jul. 16, 2004) 24 pages); Draft 802.20 Permanent Document; System Requirements for IEEE 802.20 Mobile Broadband Wireless Access Systems—Version 14.

IEEE Std. 802.16; IEEE Standard for Local and metropolitan area networks; Part 16: Air Interface for Fixed Broadband Wireless Access Systems; Apr. 8, 2002; pp. 1-322.

IEEE Std. 802.16; IEEE Standard for Local and metropolitan area networks; Part 16: Air Interface for Fixed Broadband Wireless Access Systems; Oct. 1, 2004; pp. i-xxxiv and 1-857; IEEE Std 802.16-2004, IEEE, United States.

PIPELINED PACKET ENCRYPTION AND DECRYPTION USING COUNTER MODE WITH CIPHER-BLOCK CHAINING MESSAGE AUTHENTICATION CODE PROTOCOL

CROSS-REFERENCE TO RELATED APPLICATIONS

This application is a divisional of U.S. patent application Ser. No. 10/974,458, filed Oct. 27, 2004, now U.S. Pat. No. 7,742,594, issued Jun. 22, 2010, which is related to U.S. Non-Provisional patent application Ser. No. 10/974,388, filed Oct. 27, 2004, now U.S. Pat. No. 7,697,688, issued Apr. 18, 2010. The disclosures of the above applications are incorporated by reference herein in their entirety.

BACKGROUND

The present invention relates generally to encryption and decryption of data communications packets. More particularly, the present invention relates to pipelining such encryption and decryption to achieve faster data throughput.

Network devices operating in a wireless local-area network (WLAN) must employ the Counter Mode With Cipher-Block Chaining Message Authentication Code Protocol (CCMP) to comply with the IEEE 802.11i standard to protect the confidentiality and integrity of transmitted data from malicious attacks.

According to CCMP, the sender encrypts packets of data to be sent using a temporal key negotiated with the receiver. The receiver, upon receiving the packets, decrypts the packets using the temporal key. This scheme works well as long as the transmitted packets are separated by inter-packet gaps that are large enough to allow the receiver to complete the decryption of one packet before the next packet arrives.

However, in WLAN applications that require very high throughput, data packets are transmitted in succession with no inter-packet gaps. In addition, in IEEE 802.11n Multiple Input Multiple Output (MIMO) systems, data packets are transmitted at even higher data rates, leaving even less time for decryption.

SUMMARY

In general, in one aspect, the invention features an apparatus and corresponding method and computer program for processing N encrypted Media Access Control (MAC) Payload Data Units (MPDUs), wherein $N \geq 1$. It comprises a key mixing circuit to generate N groups of Advanced Encryption Standard (AES) Output Blocks, wherein each of the AES Output Blocks is generated based upon a predetermined key, a transmitter MAC address, and a predetermined start value for a packet number; an input circuit to receive the N encrypted MPDUs, wherein each of the N encrypted MPDUs comprises the transmitter address and one of N values for the packet number, wherein each of the N values for the packet number is greater than, or equal to, the predetermined start value for the packet number; and a decryption circuit to decrypt each of the N encrypted MPDUs using the one of the N groups of AES Output Blocks that was generated based on the value for the packet number in the respective one of the N MPDUs; wherein the key mixing circuit generates each of the N groups of AES Output Blocks before the input circuit receives the respective one of the N encrypted MPDUs.

Particular implementations can include one or more of the following features. The input circuit receives a message comprising the transmitter address and the predetermined start value for the packet number before generating the N groups of AES Output Blocks. The message further comprises the value of N. Particular implementations can include a verification circuit to verify each of the N decrypted MPDUs using a Message Integrity Code (MIC) key. Particular implementations can include a countermeasures circuit to employ one or more countermeasures when any of the N decrypted packets cannot be verified. The decryption circuit selects one of the N encrypted MPDUs and decrypts M different portions of the one of the N encrypted MPDUs using the M respective ones of the AES Output Blocks that were generated based on the value for the packet number in the one of the N encrypted MPDUs. The message further comprises the value of M for each of the N encrypted MPDUs. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for processing N encrypted packets of data, wherein $N \geq 1$. It comprises a key mixing circuit to generate N groups of decryption seeds, wherein each of the decryption seeds is generated based upon a predetermined key, a transmitter address, and a predetermined start value for a packet number; an input circuit to receive the N encrypted packets, wherein each of the N encrypted packets comprises the transmitter address, and one of N values for the packet number, wherein each of the N values for the packet number is greater than, or equal to, the predetermined start value for the packet number; and a decryption circuit to decrypt each of the N encrypted packets of data using the one of the N groups of decryption seeds that was generated based on the value for the packet number in the respective one of the N encrypted packets of data; wherein the key mixing circuit generates each of the N groups of decryption seeds before the input circuit receives the respective one of the N encrypted packets of the data.

Particular implementations can include one or more of the following features. The input circuit receives a message comprising the transmitter address and the predetermined start value for the packet number before generating the N groups of decryption seeds. The message further comprises the value of N. Particular implementations can include a verification circuit to verify each of the N decrypted packets using an integrity code key. Particular implementations can include a countermeasures circuit to employ one or more countermeasures when any of the N decrypted packets cannot be verified. The decryption circuit selects one of the N encrypted packets of data and decrypts M different portions of the one of the N encrypted packets of data using the M respective ones of the decryption seeds that were generated based on the value for the packet number in the one of the N encrypted packets of data. The message further comprises the value of M for each of the N encrypted packets of data. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for transmitting N Media Access Control (MAC) Payload Data Units (MPDUs), wherein $N \geq 1$. It comprises a key mixing circuit to generate N groups of Advanced Encryption Standard (AES) Output Blocks, wherein each AES Output Block is generated based upon a predetermined key, a transmitter MAC address, and a predetermined start value for a packet number; an input circuit to receive the N MPDUs; a packet number circuit to insert a different one of N values for the packet number into each of the N MPDUs, wherein each of the N values for the packet number is greater than, or equal to, the predetermined start value for the packet number; an encryption circuit to encrypt each of the N MPDUs using the one of the N groups of AES Output Blocks that was generated based on the value for the packet number in the respective one of the N MPDUs; and an output circuit to send the N encrypted packets of data; wherein the encryption circuit generates each of the N groups of AES Output Blocks before the input circuit receives the respective one of the N MPDUs.

Particular implementations can include one or more of the following features. The output circuit sends a message comprising the transmitter address and the predetermined start value for the packet number before sending the N encrypted packets of data. The message further comprises the value of N. Particular implementations can include an integrity circuit to generate a Message Integrity Code (MIC) for each of the N MPDUs using a MIC key and insert each MIC into a respective one of the N MPDUs before the encryption circuit encrypts the respective one of the N MPDUs. To encrypt each of the N MPDUs, the encryption circuit selects one of the N MPDUs and encrypts M different portions of the one of the N MPDUs using M respective ones of the AES Output Blocks that were generated based on the value for the packet number in the one of the N MPDUs. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for transmitting N packets of data, wherein N≧1. It comprises a key mixing circuit to generate N groups of encryption seeds, wherein each encryption seed is generated based upon a predetermined key, a transmitter address, and a predetermined start value for a packet number; an input circuit to receive the N packets of data; a packet number circuit to insert a different one of N values for the packet number into each of the N packets of data, wherein each of the N values for the packet number is greater than, or equal to, the predetermined start value for the packet number; an encryption circuit to encrypt each of the N packets of data using the one of the N groups of encryption seeds that was generated based on the value for the packet number in the respective one of the N packets of data; and an output circuit to send the N packets of data; wherein the encryption circuit generates each of the N groups of encryption seeds before the input circuit receives the respective one of the N packets of data.

Particular implementations can include one or more of the following features. The output circuit sends a message comprising the transmitter address, and the predetermined start value for the packet number before sending the N packets of data. The message further comprises the value of N. Particular implementations can include an integrity circuit to generate an integrity code for each of the N packets of data using an integrity code key and insert each an integrity code into a respective one of the N packets of data before encrypting the respective one of the N packets of data. To encrypt each of the N packets of data, the encryption circuit selects one of the N packets of data and encrypts M different portions of the one of the N packets of data using M respective ones of the encryption seeds that were generated based on the value for the packet number in the one of the N packets of data. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for transmitting N Media Access Control (MAC) Payload Data Units (MPDUs), wherein N≧1. It comprises an output circuit to send a message comprising a transmitter MAC address and a predetermined start value for a packet number; a packet number circuit to insert a different one of N values for the packet number into each of the N MPDUs, wherein each of the N values for the packet number is greater than, or equal to, the predetermined start value for the packet number; a key mixing circuit to generate N groups of Advanced Encryption Standard (AES) Output Blocks, wherein each AES Output Block is generated based upon a predetermined key, the transmitter address, and the predetermined start value for the packet number; and an encryption circuit to encrypt each of the N MPDUs using the one of the N groups of AES Output Blocks that was generated based on the value for the packet number in the respective one of the N MPDUs; wherein the output circuit sends the N encrypted MPDUs after sending the message.

Particular implementations can include one or more of the following features. Particular implementations can include an integrity circuit to generate a Message Integrity Code (MIC) for each of the N MPDUs using a MIC key and insert each MIC into a respective one of the N MPDUs before the encryption circuit encrypts the respective one of the N MPDUs. The message further comprises the value of N. To encrypt each of the N MPDUs, the encryption circuit selects one of the N MPDUs and encrypts M different portions of the one of the N MPDUs using the M respective ones of the AES Output Blocks that were generated based on the value for the packet number in the one of the N MPDUs. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features an apparatus and corresponding method and computer program for transmitting N packets of data, wherein N≧1. It comprises an output circuit to send a message comprising a transmitter address and a predetermined start value for a packet number; a packet number circuit to insert a different one of N values for the packet number into each of the N packets of data, wherein each of the N values for the packet number is greater than, or equal to, the predetermined start value for the packet number; a key mixing circuit to generate N groups of encryption seeds, wherein each encryption seed is generated based upon a predetermined key, the transmitter address, and the predetermined start value for the packet number; an encryption circuit to encrypt each of the N packets of data using the one of the N groups of encryption seeds that was generated based on the value for the packet number in the respective one of the N packets of data; wherein the output circuit sends the N encrypted packets of data after sending the message.

Particular implementations can include one or more of the following features. Particular implementations can include an integrity circuit to generate an integrity code for each of the N packets of data using an integrity code key and insert each integrity code into a respective one of the N packets of data before the encryption circuit encrypts the respective one of the N packets of data. The message further comprises the value of N. To encrypt each of the N packets of data, the encryption circuit selects one of the N encrypted packets of data and decrypts M different portions of the one of the N encrypted packets of data using M respective ones of the encryption seeds that were generated based on the value for the packet number in the one of the N encrypted packets of data. A network device comprises the apparatus. The wireless network device is otherwise compliant with at least one standard selected from the group consisting of IEEE standards 802.11, 802.11a, 802.11b, 802.11g, 802.11n, 802.16, and 802.20. The wireless network device is compliant with IEEE standard 802.11i.

In general, in one aspect, the invention features a packet comprising packet number information representing a number N of Media Access Control (MAC) Payload Data Units (MPDUs) encrypted according to Counter Mode With Cipher-Block Chaining Message Authentication Code Protocol (CCMP) to be transmitted following the packet, wherein N≧1; a transmitter MAC address for a transmitter of the N encrypted MPDUs; a receiver MAC address for a receiver of the N encrypted MPDUs; and length information representing a length of each of the N encrypted MPDUs.

Particular implementations can include one or more of the following features. The packet number information comprises a predetermined start value for a packet number, wherein each of the N encrypted MPDUs comprises a value for the packet number that is greater than, or equal to, the predetermined start value for the packet number; and a predetermined range value representing a range of values of the packet numbers in the N encrypted MPDUs.

In general, in one aspect, the invention features a packet comprising packet number information representing a number N of encrypted packets to be transmitted following the packet, wherein N≧1; a transmitter address for a transmitter of the N encrypted packets; a receiver address for a receiver of the N encrypted packets; and length information representing a length of each of the N encrypted packets.

Particular implementations can include one or more of the following features. The packet number information comprises a predetermined start value for a packet number, wherein each of the N encrypted packets comprises a value for the packet number that is greater than, or equal to, the predetermined start value for the packet number; and a predetermined range value representing a range of values of the packet numbers in the N encrypted packets.

The details of one or more implementations are set forth in the accompanying drawings and the description below. Other features will be apparent from the description and drawings, and from the claims.

Figure 1:
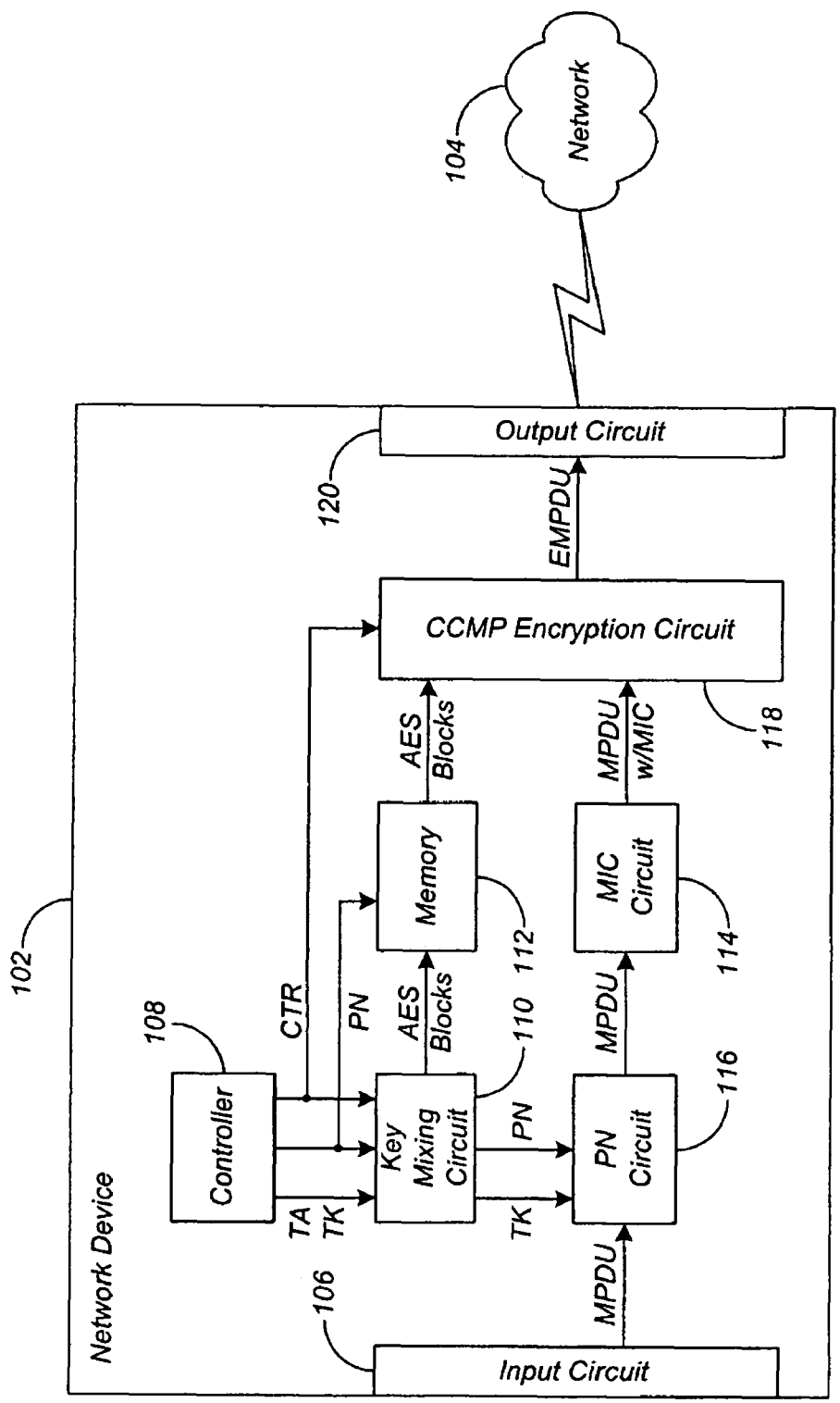
FIG. 1 shows a network device in communication with a network such as a wireless local-area network (WLAN) according to a preferred embodiment.

The leading digit(s) of each reference numeral used in this specification indicates the number of the drawing in which the reference numeral first appears.

DETAILED DESCRIPTION

Embodiments of the present invention employ pipelining strategies that allow encryption and decryption of packets in two stages, one of which is implemented for each packet before the packet is received. These pipelining approaches significantly reduce the time required to encrypt and decrypt a series of packets.

The two stages are encryption seed generation and encryption or decryption. When certain parameters for the packets to be received are known or assumed in advance, the encryption seeds for the packets can be generated before receiving the packets. Therefore the packets can be encrypted or decrypted immediately upon arrival, rather than after the time-consuming encryption seed generation process.

Embodiments of the present invention are described with respect to the Counter Mode With Cipher-Block Chaining Message Authentication Code Protocol (CCMP) specified by the IEEE 802.11i standard (April 2004). However, as will be apparent to one skilled in the relevant arts after reading this description, the techniques disclosed herein are equally applicable to other sorts of encryption and encapsulation protocols, and to wired networks as well as wireless networks.

FIG. 1 shows a network device 102 in communication with a network 104 such as a wireless local-area network (WLAN) according to a preferred embodiment. Network device 102 comprises an input circuit 106, a controller 108, a key mixing circuit 110, a memory 112, a Message Integrity Code (MIC) circuit 114, a packet number (PN) circuit 116, a CCMP encryption circuit 118, and an output circuit 120. According to some embodiments, network device 102 is compliant with IEEE standards 802.11i, and is otherwise compliant with one or more of IEEE standards 802.11 (1999 Edition), 802.11a (1999 Edition, Amended 2000), 802.11b (16 Sep. 1999 Edition), 802.11g (April 2003), 802.11n (e.g., IEEE P802.11-04/0889r6), 802.16 (Apr. 8, 2002), and 802.20-PD-06 (Jul. 16, 2004), the disclosures thereof incorporated herein by reference in their entirety.

Figure 2:
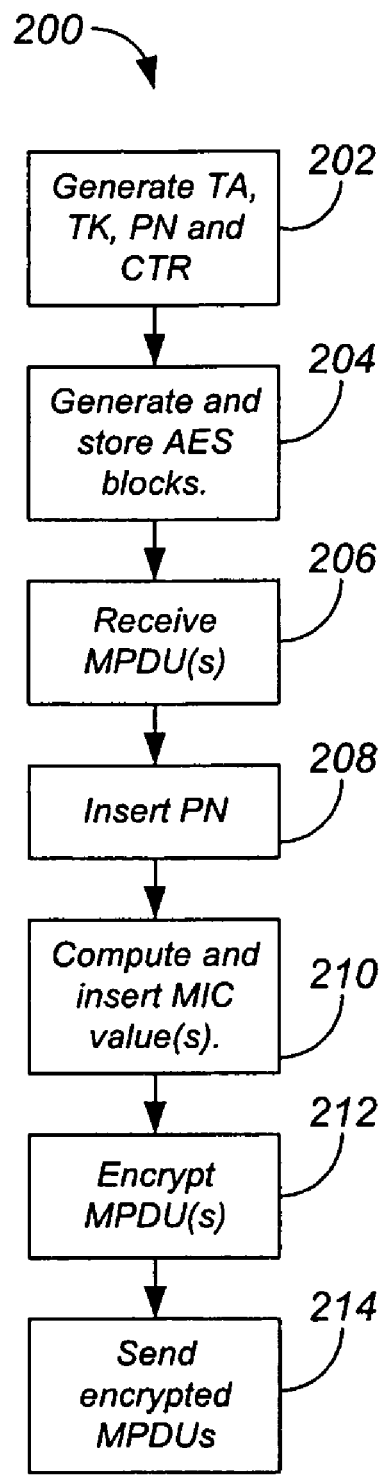
FIG. 2 shows a pipelined two-stage encryption and transmission process for network device of FIG. 1 according to a preferred embodiment.

FIG. 2 shows a pipelined two-stage encryption and transmission process 200 for network device 102 of FIG. 1 according to a preferred embodiment. In the second of the two stages, each of N Media Access Control (MAC) Payload Data Units (MPDUs) are encrypted using one of N groups of Advanced Encryption Standard (AES) Output Blocks (also referred to herein as "AES blocks"). The first stage of the process generates the N groups of AES blocks ahead of time so they are ready when the second stage begins.

Referring to FIG. 2, controller 108 provides a transmitter MAC address TA, a temporal key TK, and at least a start value for a packet number (PN) and counter (CTR) to key mixing circuit 110 (step 202). The transmitter MAC address TA is a MAC address for network device 102. The temporal key TK is a key that is negotiated in advance by network device 102 and an intended receiver, as is well-known in the relevant arts. The PN is a counter for the MPDUs to ensure sequential reception at the intended receiver, as described in detail below. The CTR is a counter to count the number of 16-octet blocks in the payload of each MPDU.

Key mixing circuit 110 generates each of the N groups of AES blocks based upon temporal key TK, transmitter MAC address TA, and the start value for PN, and stores the N groups of AES blocks in memory 112 (step 204). Preferably key mixing circuit 110 generates a group of AES blocks for each of N sequential values of PN beginning with the start value provided by controller 108, although other methods could be used. The start value for PN is preferably initialized to one (PN=1) during initialization of network device 102, and is incremented for each group of AES blocks generated.

Each group of AES blocks comprises multiple AES block ciphers, each having a length of 16 octets. Preferably key mixing circuit 110 generates a AES block for each of M sequential values of CTR beginning with the start value provided by controller 108, although other methods could be used. The start value for CTR is preferably initialized to one (CTR=1) for each MPDU, and is incremented for each AES block cipher generated. A full description of this operation is given in IEEE standard 802.11i.

Input circuit 106 subsequently receives one or more MPDUs (step 206), for example from a host unit or processor within network device 102. PN circuit 116 inserts a value for PN into each MPDU so the MPDUs are numbered sequentially (step 208). Each of the N values for the PN is greater than, or equal to, the start value for the PN.

MIC circuit 114 computes a MIC value for each MPDU based upon a MIC key, and inserts the MIC value into the respective MPDU (step 210) according to methods well-known in the relevant arts.

CCMP encryption circuit 118 encrypts each of the N MPDUs using the one of the N groups of AES blocks that was generated based on the value for the PN in the respective one of the N MPDUs (step 212). For example, CCMP encryption circuit 118 receives a MPDU from PN circuit 116 and the corresponding group of AES blocks from memory 112, and performs the encryption according to methods well-known in the relevant arts to produce an encrypted MPDU (EMPDU).

Output circuit 120 sends the N EMPDUs (step 214). For example, output circuit 120 can comprise a wireless physical-layer device (PHY) and antenna. As another example, output circuit 120 can be a MAC output circuit that provides the EMPDUs to a separate PHY and antenna for transmission to network 104.

According to process 200, key mixing circuit 110 generates each of the N groups of AES blocks before input circuit 106 receives the respective MPDUs. Therefore each group of AES blocks is available when the corresponding MPDU arrives at CCMP encryption circuit 118. This pipelining process ensures that no time is wasted in waiting for a group of AES blocks to be generated after receiving the corresponding MPDU.

Figure 3:
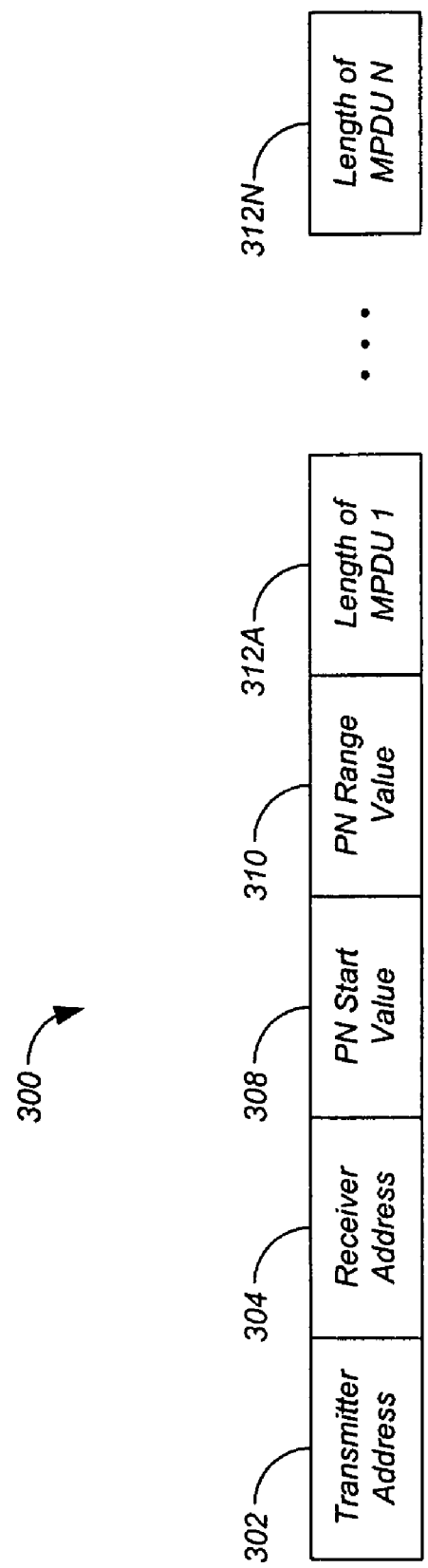
FIG. 3 shows the format of a pipelining setup message according to a preferred embodiment.

In some embodiments, network device 102 generates and sends a pipelining setup message containing information describing the N MPDUs before sending the MPDUs. The pipelining setup message can be used by the intended recipient to pipeline the decryption process, as described in detail below. Network device 102 can generate and send the pipelining setup message either with or without performing the pipelining process 200 described above. FIG. 3 shows the format of a pipelining setup message 300 according to a preferred embodiment.

Pipelining setup message 300 preferably comprises a transmitter address 302, a receiver address 304, a PN start value 308, an optional PN range value 310, and the lengths 312A-312N of each of the N MPDUs represented by pipelining setup message 300. Transmitter address 302 is preferably the 6-byte MAC address of network device 102. Receiver address 304 is preferably the 6-byte MAC address of a wireless receiver, such as a wireless access point, in network 104.

PN start value 308 is the 6-byte value of PN for the first of the N MPDUs to be sent. PN range value 310 is a 1-byte value representing the number N of MPDUs to be sent. Of course, the PN information can be represented in other ways in pipelining setup message 300. For example, instead of including the start value and range for PN, the PN information could comprise the end value and range, the start and end values, or any other parameters that can be used to calculate the start and range values of PN. Each length value 312 is a 1-byte value representing the length in bytes of the respective MPDU.

Figure 4:
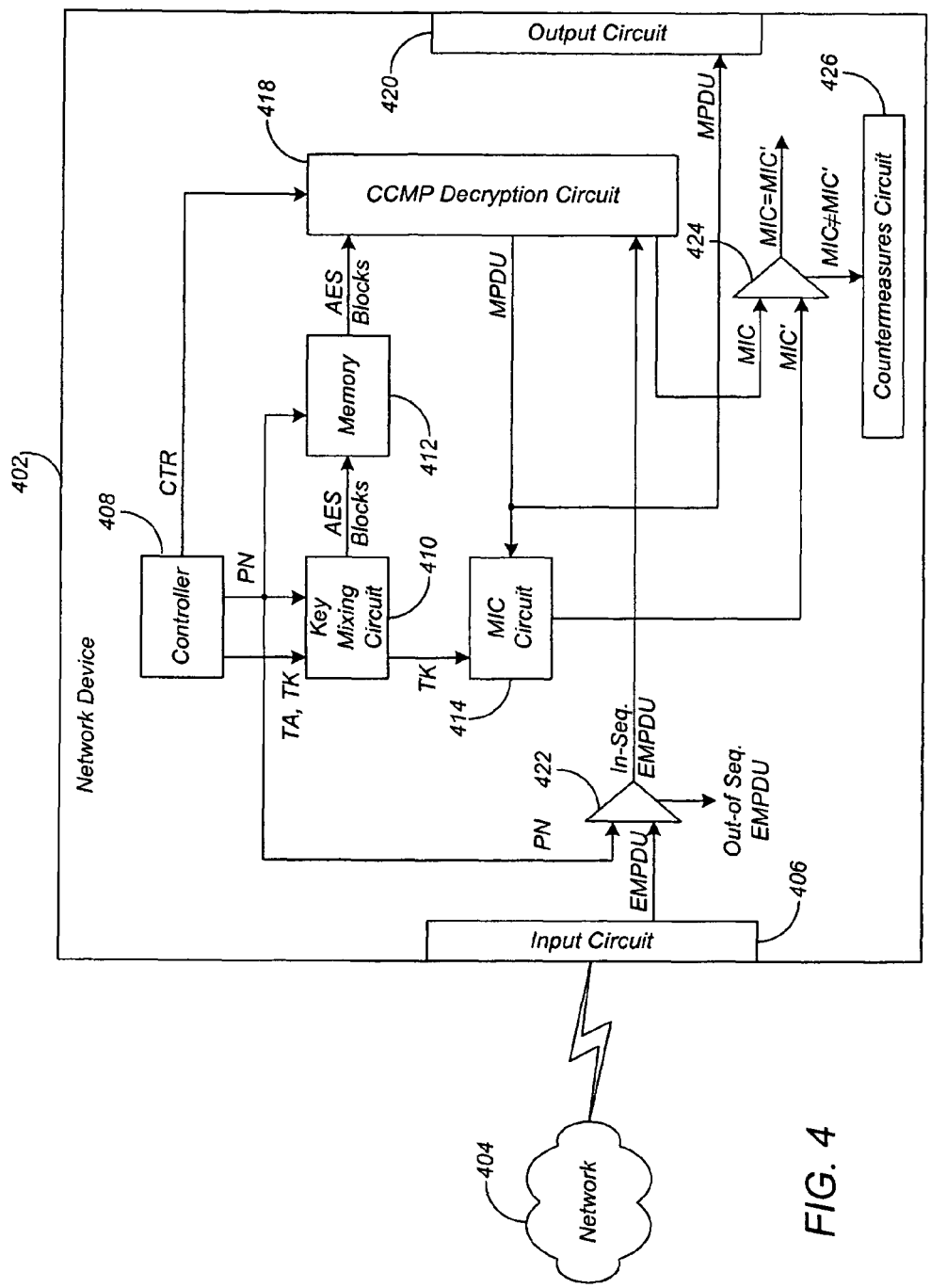
FIG. 4 shows a network device in communication with a network such as a WLAN according to a preferred embodiment.

FIG. 4 shows a network device 402 in communication with a network 404 such as a wireless local-area network (WLAN) according to a preferred embodiment. Network device 402 comprises an input circuit 406, a controller 408, a key mixing circuit 410, a memory 412, a Message Integrity Code (MIC) circuit 414, a CCMP decryption circuit 418, an output circuit 420, optional comparators 422 and 424, and an optional countermeasures circuit 426. According to some embodiments, network device 402 is compliant with IEEE standards 802.11i, and is otherwise compliant with one or more of IEEE standards 802.11, 802.11a, 802.11b, 802.11g, 802.11n, 802.16, and 802.20, the disclosures thereof incorporated herein by reference in their entirety.

Figure 5:
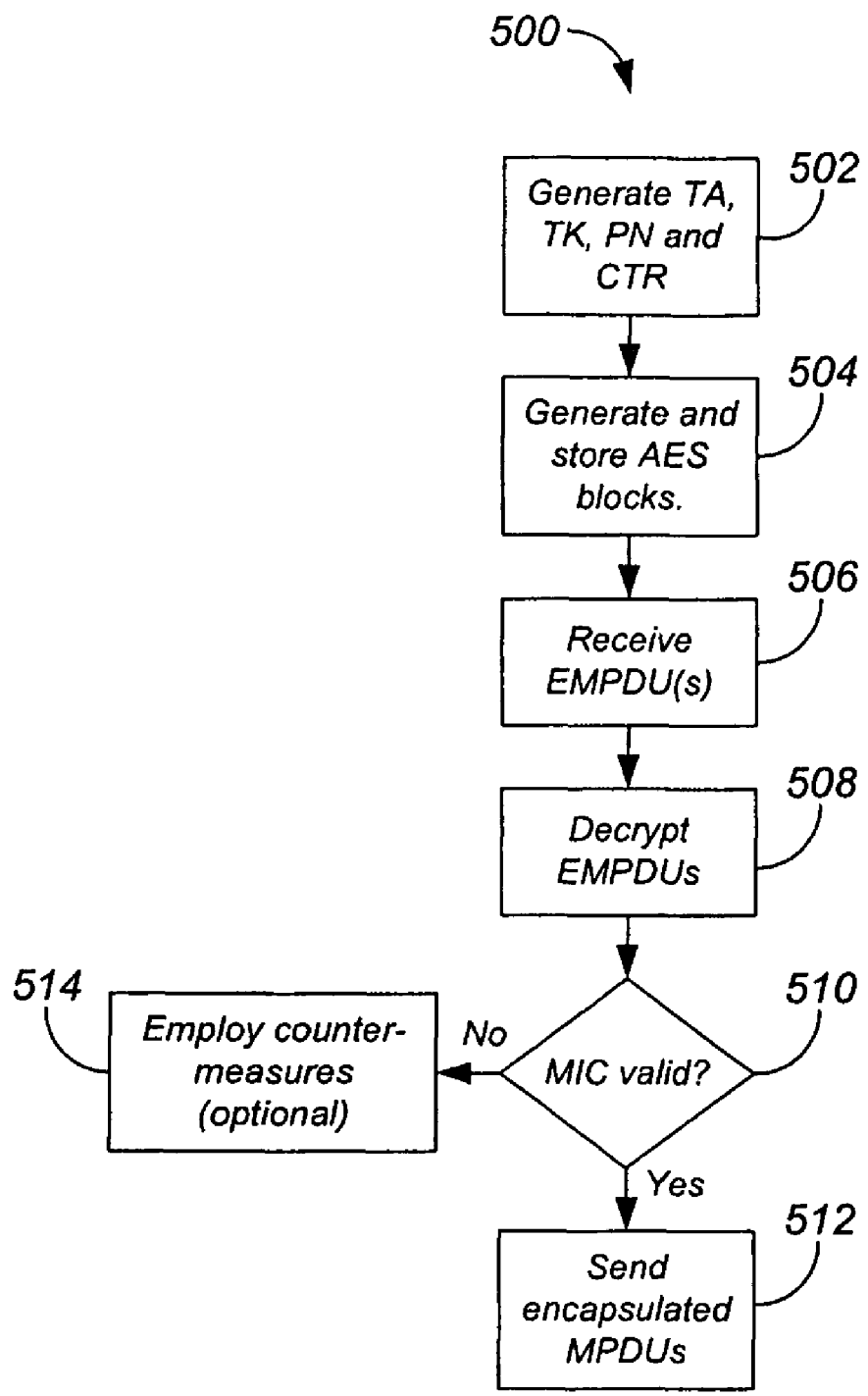
FIG. 5 shows a pipelined two-stage reception and decryption process for network device of FIG. 4 according to a preferred embodiment.

FIG. 5 shows a pipelined two-stage reception and decryption process 500 for network device 402 of FIG. 4 according to a preferred embodiment. In the second of the two stages, each of N encrypted MPDUs (EMPDUs) are decrypted using one of N groups of AES blocks. The first stage of the process generates the N groups of AES blocks ahead of time so they are ready when the second stage begins.

Referring to FIG. 5, controller 408 provides a transmitter MAC address TA, a temporal key TK, and at least a start value for a packet number (PN) and counter (CTR) to key mixing circuit 410 (step 502). The transmitter MAC address TA is a MAC address for the network device transmitting the MPDUs. The temporal key TK is a key that is negotiated in advance by network device 402 and the network device transmitting the MPDUs, as is well-known in the relevant arts. The PN is a counter for the MPDUs to ensure sequential reception at the intended receiver, as described in detail below. The CTR is a counter to count the number of 16-octet blocks in the payload of each MPDU.

In some embodiments, the network device transmitting the MPDUs first transmits a pipelining setup message such as the pipelining setup message described above with reference to FIG. 3 before transmitting the MPDUs. Network device 402 then extracts TA and generates the PN and CTR values for each MPDU based on the pipelining setup message.

In other embodiments, network device 402 generates TA and the values for PN and CTR without the use of a pipelining setup message. For example, network device 402 can generate a set of AES blocks for one or more of the known transmitters in network 404 using PN values that are assumed or tracked by monitoring network traffic and CTR values limited by a maximum expected MPDU size. In some embodiments, each network device maintains a separate PN counter for each of the other network devices. The network devices can set PN=1 on network initialization, association with the corresponding network device, and the like, to ensure that their PN counters remain synchronized. In such embodiments, no pipelining setup message is needed.

Key mixing circuit 410 generates each of the N groups of AES blocks based upon temporal key TK, transmitter MAC address TA, and the start value for PN, and stores the N groups of AES blocks in memory 412 (step 504). Preferably key mixing circuit 410 generates a group of AES blocks for each of N sequential values of PN beginning with the start value provided by controller 408, although other methods could be used. The start value for PN is preferably initialized to one (PN=1) during initialization of network device 402, and is incremented for each group of AES blocks generated.

Input circuit 406 subsequently receives N EMPDUs (step 506). For example, input circuit 406 can comprise a wireless physical-layer device (PHY) and antenna. As another example, input circuit 406 can be a MAC input circuit that receives the EMPDUs from a separate PHY and antenna in communication with network 404.

Optional comparator 322 checks the value of PN in each EMPDU against the expected value. Out-of-sequence EMPDUs are discarded. In-sequence EMPDUs are provided to CCMP decryption circuit 418.

CCMP decryption circuit 418 decrypts each of the N EMPDUs using the one of the N groups of AES blocks that was generated based on the value for the PN in the respective one of the N EMPDUs (step 508). For example, CCMP decryption circuit 418 receives an EMPDU and receives the corresponding group of AES blocks from memory 412, and performs the decryption according to methods well-known in the relevant arts to produce a decrypted MPDU.

MIC circuit 414 computes a MIC value for each MPDU based upon a MIC key (step 510). Optional comparator 324 checks the value of PN in each MPDU against the computed value. If the MIC values are equal, output circuit 420 sends the MPDU (step 512), for example to a host unit or processor within network device 402. Otherwise, optional countermeasures circuit 326 employs one or more countermeasures (step 514) such as those described in IEEE standard 802.11i.

According to process 500, key mixing circuit 410 generates each of the N groups of AES blocks before input circuit 406 receives the respective MPDU. Therefore each group of AES blocks is available when the corresponding MPDU arrives at CCMP decryption circuit 418. This pipelining process ensures that no time is wasted in waiting for a group of AES blocks to be generated after receiving the corresponding MPDU.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus for processing N encrypted packets, wherein N is an integer and N≧1, the apparatus comprising:
a key mixing circuit to generate N groups of decryption seeds, wherein each of the N groups of decryption seeds is generated based upon a predetermined key, a transmitter address, and a predetermined start value for a packet number;
an input circuit to receive the N encrypted packets, wherein each of the N encrypted packets comprises the transmitter address, and one of N values for the packet number, wherein each of the N values for the packet number is greater than, or equal to, the predetermined start value for the packet number; and
a decryption circuit to decrypt each of the N encrypted packets using one of the N groups of decryption seeds that was generated based on the one of the N values for the packet number in a respective one of the N encrypted packets,
wherein the key mixing circuit generates each of the N groups of decryption seeds before the input circuit receives the respective one of the N encrypted packets of the data, and
wherein the predetermined start value is (i) initialized when the apparatus is initialized and (ii) incremented when each of the N groups of decryption seeds is generated.

2. The apparatus of claim 1:
wherein the input circuit receives a message comprising the transmitter address and the predetermined start value for the packet number before generating the N groups of decryption seeds.

3. The apparatus of claim 2:
wherein the message further comprises information describing the N encrypted packets.

4. The apparatus of claim 1, further comprising:
a verification circuit to verify each of the N decrypted packets using an integrity code key.

5. The apparatus of claim 1, further comprising:
a countermeasures circuit to employ one or more countermeasures when any of the N decrypted packets cannot be verified.

6. The apparatus of claim 1:
wherein the decryption circuit selects one of the N encrypted packets and decrypts M different portions of the one of the N encrypted packets using M respective ones of the decryption seeds from the one of the N groups of decryption seeds that were generated based on the one of the N values for the packet number in the one of the N encrypted packets, where M is an integer greater than 1.

7. The apparatus of claim 6:
wherein the input circuit receives a message comprising a value of M for each of the N encrypted packets.

8. A network device comprising the apparatus of claim 1.

9. The network device of claim 8, wherein the network device comprises a wireless network device which is otherwise compliant with at least one standard selected from a group consisting of standards 802.11, 802.11a, 802.11b, 802.11g, 802.11n, 802.16, and 802.20 defined by Institute of Electrical and Electronics Engineers.

10. The network device of claim 8, wherein the network device comprises a wireless network device which is compliant with a standard 802.11i defined by Institute of Electrical and Electronics Engineers.

11. A method for processing N encrypted packets in an apparatus, wherein N is an integer and N≧1, the method comprising:
- generating N groups of decryption seeds, wherein each of the N groups of decryption seeds is generated based upon a predetermined key, a transmitter address, and a predetermined start value for a packet number;
- receiving the N encrypted packets, wherein each of the N encrypted packets comprises the transmitter address, and one of N values for the packet number, wherein each of the N values for the packet number is greater than, or equal to, the predetermined start value for the packet number; and
- decrypting each of the N encrypted packets using the one of the N groups of decryption seeds that was generated based on the one of the N values for the packet number in a respective one of the N encrypted packets,
- wherein each of the N groups of decryption seeds is generated before receiving the respective one of the N encrypted packets of the data, and
- wherein the predetermined start value is (i) initialized when the apparatus is initialized and (ii) incremented when each of the N groups of decryption seeds is generated.

12. The method of claim 11, further comprising:
receiving a message comprising the transmitter address and the predetermined start value for the packet number before generating the N groups of decryption seeds.

13. The method of claim 12:
wherein the message further comprises information describing the N encrypted packets.

14. The method of claim 11, further comprising:
verifying each of the N decrypted packets using an integrity code key.

15. The method of claim 11, further comprising:
employing one or more countermeasures when verifying any of the N decrypted packets fails.

16. The method of claim 11, wherein decrypting each of the N encrypted packets comprises:
- selecting one of the N encrypted packets; and
- decrypting M different portions of the one of the N encrypted packets using M respective ones of the decryption seeds from the one of the N groups of decryption seeds that were generated based on the one of the N values for the packet number in the one of the N encrypted packets, where M is an integer greater than 1.

17. The method of claim 16, further comprising:
receiving a message comprising a value of M for each of the N encrypted packets.

* * * * *